Feb. 27, 1968 R. CARRÉ 3,371,342

FILTERING DEVICE

Filed Jan. 17, 1967 5 Sheets-Sheet 1

Feb. 27, 1968 R. CARRÉ 3,371,342

FILTERING DEVICE

Filed Jan. 17, 1967 5 Sheets-Sheet 4

Feb. 27, 1968 R. CARRÉ 3,371,342

FILTERING DEVICE

Filed Jan. 17, 1967 5 Sheets-Sheet 5

United States Patent Office 3,371,342
Patented Feb. 27, 1968

3,371,342
FILTERING DEVICE

Roland Carré, Paris, France, assignor to CSF—Compagnie Generale de Telegraphie Sans Fil, a corporation of France Filed Jan. 17, 1967, Ser. No. 610,719
Claims priority, application France, Jan. 18, 1966, 46,298, Patent 1,471,219
3 Claims. Cl. 343—17.1)

ABSTRACT OF THE DISCLOSURE

A method for filtering a signal with a periodical fluctuation, consisting in a first, entirely digital, filtering, with weighting coefficients corresponding to a simple shifting of the radix in the considered code so that the digital filtering does not involve any waste of time, and a second filtering, comprising digital transfer steps and an analogue type weighted summation.

The present invention relates to filters sometimes called "comb-filters," used, for example, in radar technics, for separating the echoes of moving targets from the echoes of fixed targets, or for sorting the echoes from moving targets according to their radial velocities.

It is already known to use in such filters a plurality of delay devices and to form the weighted sum of the signals corresponding to the different delays. The performance of the obtained filter is limited by the inaccuracies of the delaying devices.

Digital filtering has been also used: the delays are replaced by transfers of sampled coded information items into digital memories. The required weighted sums may be formed in an arithmetic computer, or, after the decoding of the stored information, in an analogue algebraic adder. Where an arithmetic calculator is used, the time necessary for the calculating is often incompatible with the flow of the treated information. The decoding, followed by an analogue computation, may be sufficiently fast, but the precision obtained, is generally insufficient.

It is an object of the invention to avoid these drawbacks by providing a system which is both sufficiently fast and accurate.

According to the invention there is provided a method for filtering signals with a periodical fluctuation, said method comprising the following steps: receiving said signals; sampling said signals with a predetermined period to obtain periodically repeated samples; digitally coding said samples according to a given code; storing $n$ successive samples, where $n$ is an integer greater than one; affecting with respective weighting coefficients said stored signals, said weighting coefficients corresponding to displacement of the radix of said code, to obtain weighted signals; forming a weighted sum of said signals; storing $m$ successive weighted sums where $m$ is an integer; decoding said $m$ weighted sums to obtain decoded signals; affecting said signals with predetermined weighting coefficients to obtain weighted signals; and making a weighted sum thereof.

For a better understanding of the invention and to show how the same may be carried into effect, reference will be made to the drawings accompanying the following description and in which:

FIG. 1 is a diagram of a known comb filter with delay devices;

FIGS. 2*a* and 2*b* are diagrams relating to the device of FIG. 1;

Figure 7:
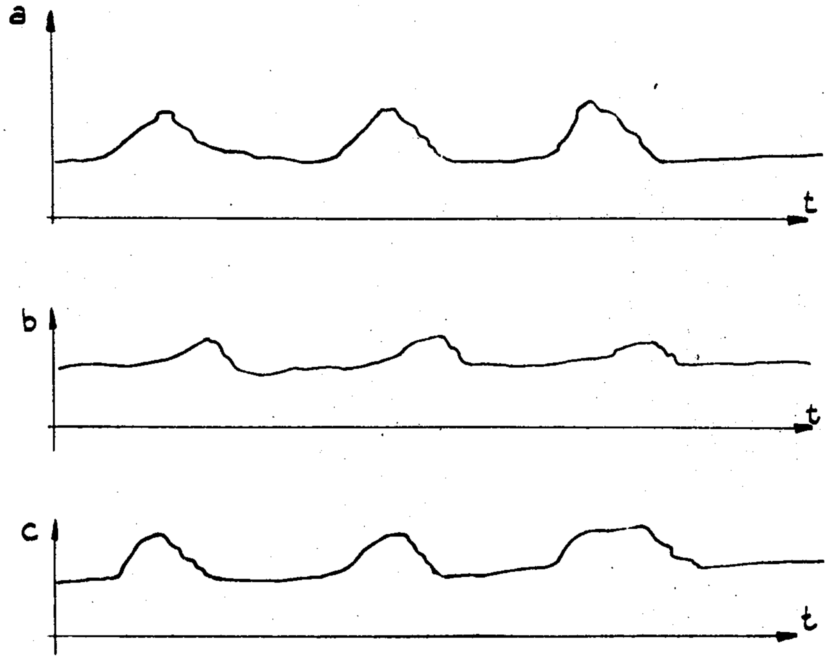
Figure 4:
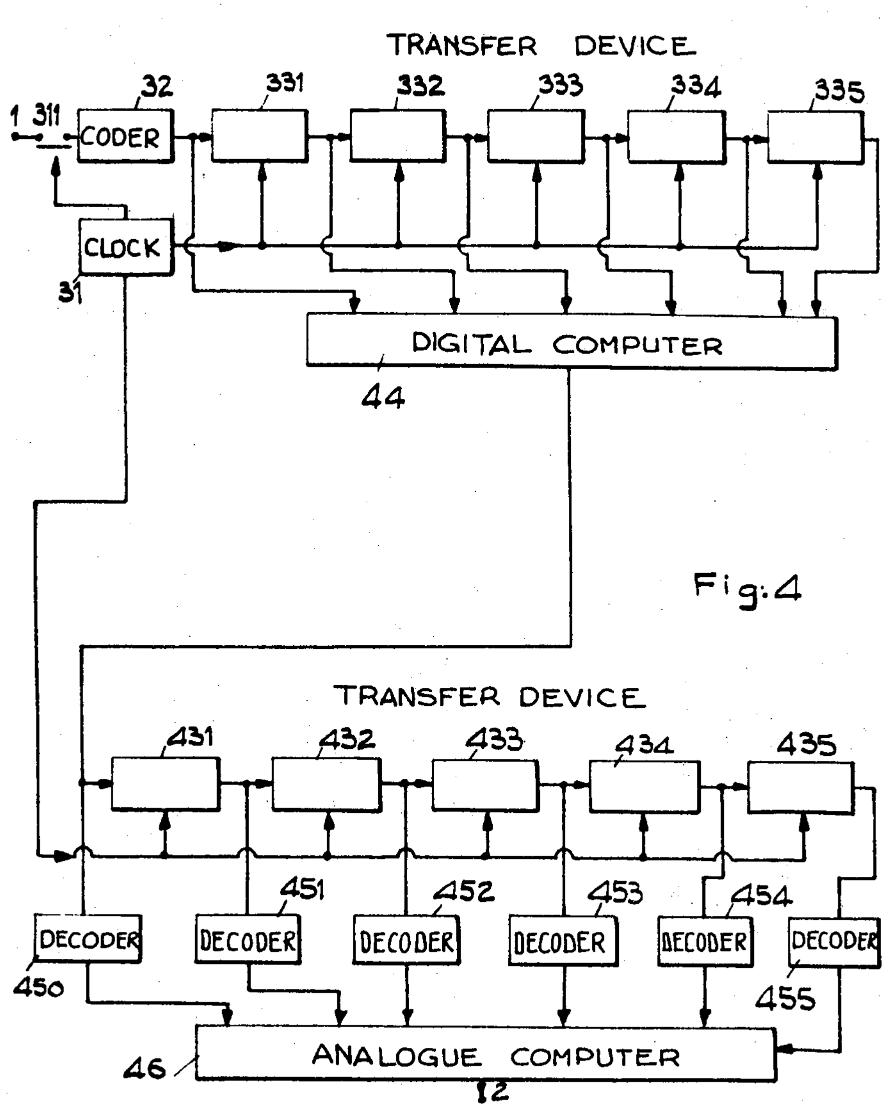
FIG. 4 is a diagram of a filter according to the invention.
Figure 5B:
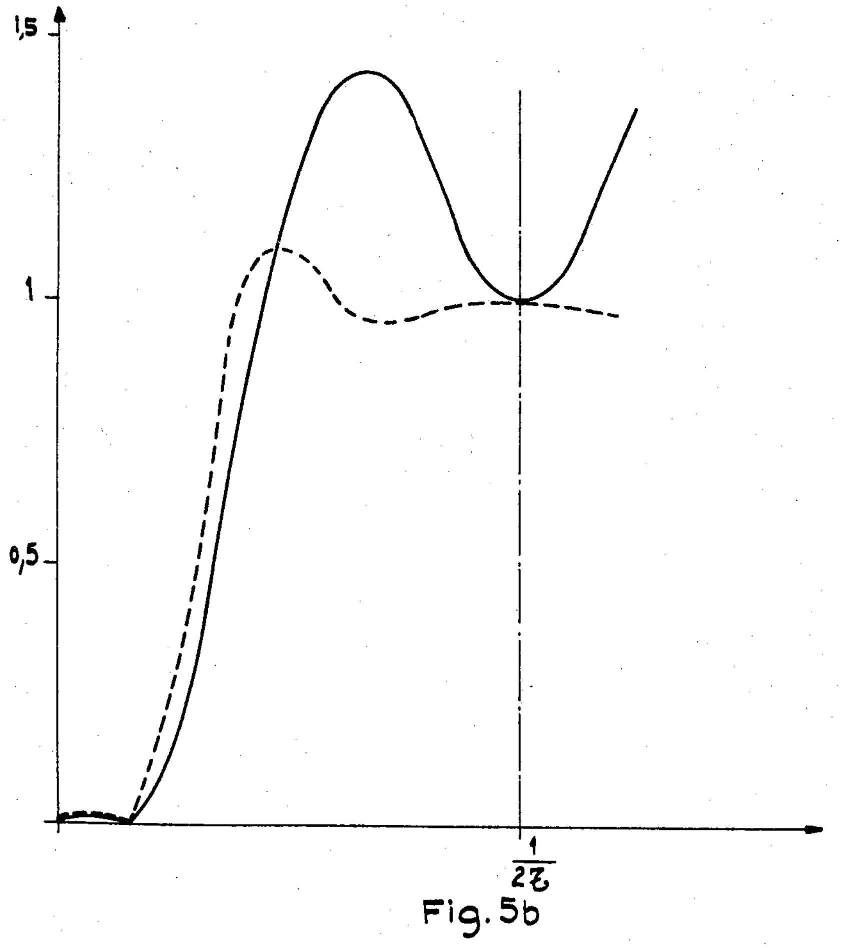
Figure 5A:
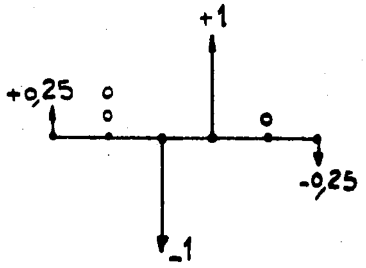
Figure 5C:
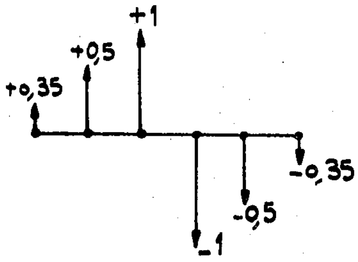
Figure 6:
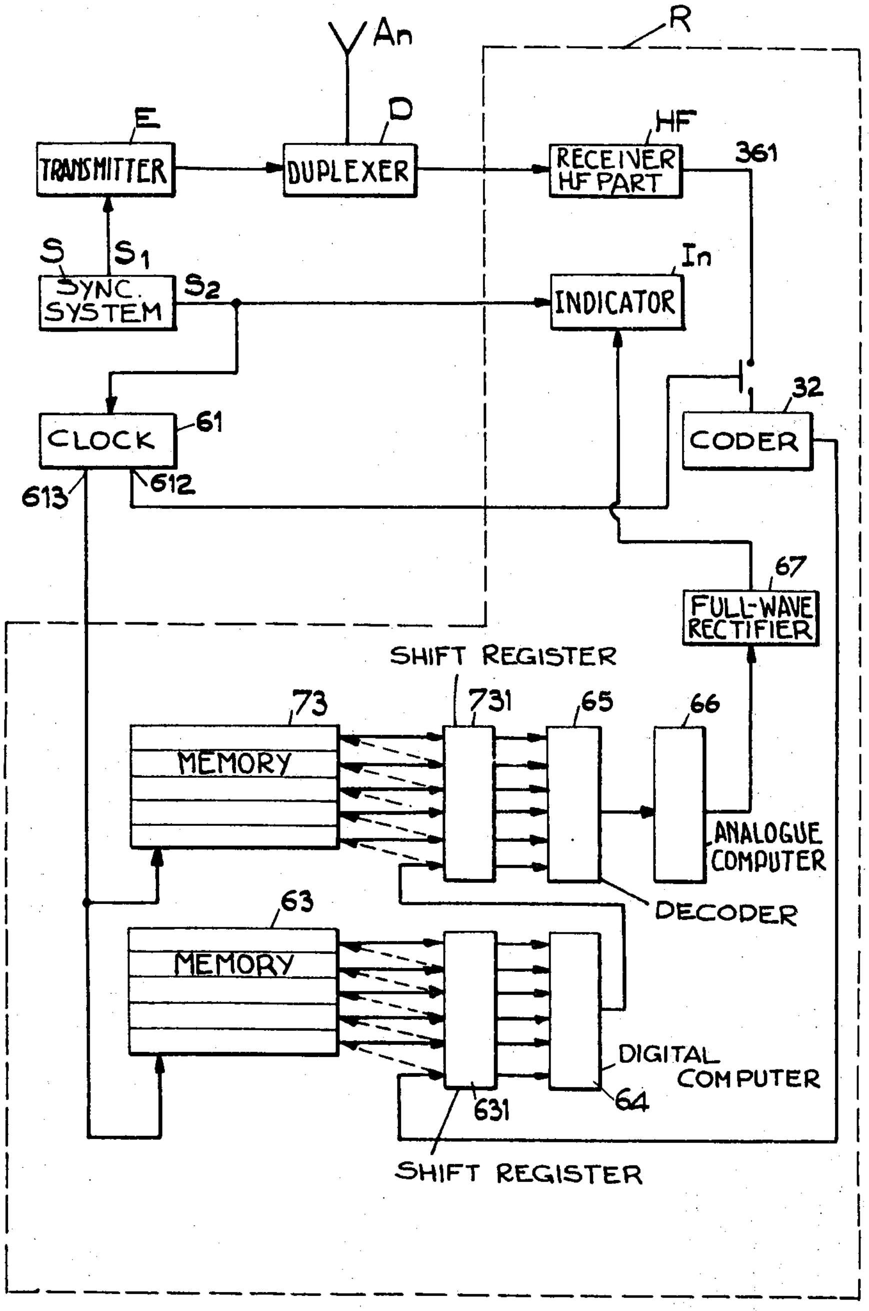

FIGS. 5*a*, 5*b* and 5*c* are diagrams relating to the arrangement shown in FIG. 4;

FIG. 6 is a diagram of a pulse radar system with a filtering device according to the invention; and FIG. 7 is an example of continuous signals capable of being filtered according to the invention.

Figure 1:
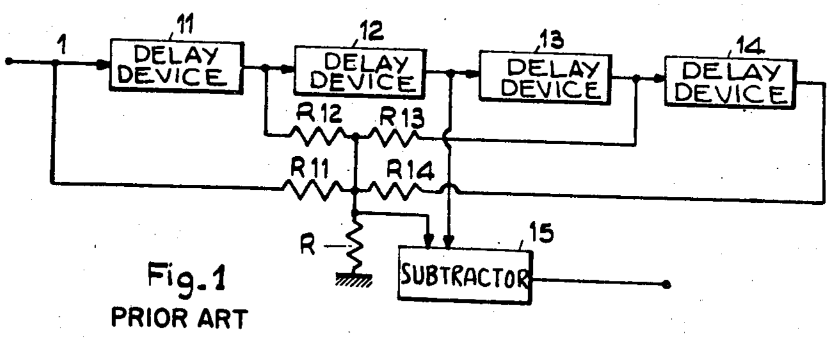
Fig. 1 PRIOR ART

The known comb filter shown in FIG. 1 essentially comprises four identical delay lines 11, 12, 13 and 14, connected in series to an input terminal 1 to which the signals to be "filtered" are applied, that is, in the case of a pulse radar receiver, the coherent detected echoes. Each delay line introduces a delay $\tau$, equal, for example, to the repetition period of the radar pulses considered, or, more generally, to the mean fluctuation period of the function to be filtered.

Figure 2A:
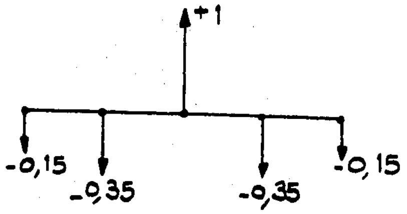

The inputs and outputs of the delay lines 11 to 14 are connected to a bridge of weighting resistances as shown in FIG. 1, which supplies the useful signal, shown in FIGS. 2*a*. In this example, the weighting coefficients are negative and smaller than the unit for the terminal 1 and the outputs of the delay lines 11, 13, 14, positive and equal to the unit for the output of the delay line 12. The weighting is obtained by connecting the terminal 1 and the outputs of the lines 11, 13, 14, respectively, to the resistors R11, R12, R13, R14, whose respective values are inverse functions of the weighting coefficients. These resistances have a common point which is grounded through a resistor R, which point and the output of the line 12 are connected, for example, to the inputs of a subtractor, such as, for example, a differential amplifier 16, which supplies the filtered signal at its output 2.

Naturally, the number of delay lines may be different. This member, as well as the weighting coefficients, depends on the filtering desired.

Figure 2B:
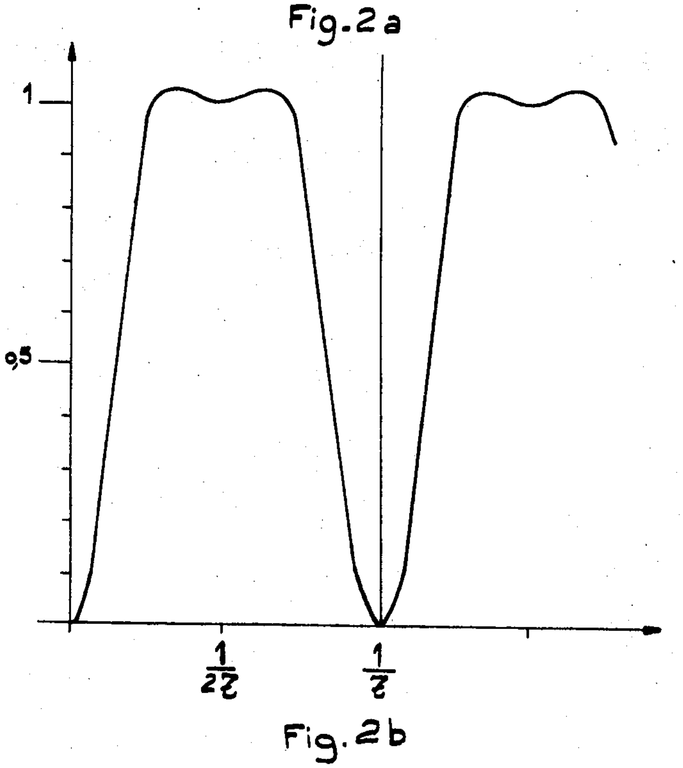

The amplitude-frequency characteristic of such a filter is shown in FIG. 2*b* in the case where the weighting law is that of FIG. 2*a*. It presents a repetition period equal to the delay of one elementary delay line. The function representing each repeated part is equal to the Fourier transform of the weighting function. Generally speaking, the number of delay lines determines the steepness of the curve and the weighting coefficients determine its zeros.

Figure 3:
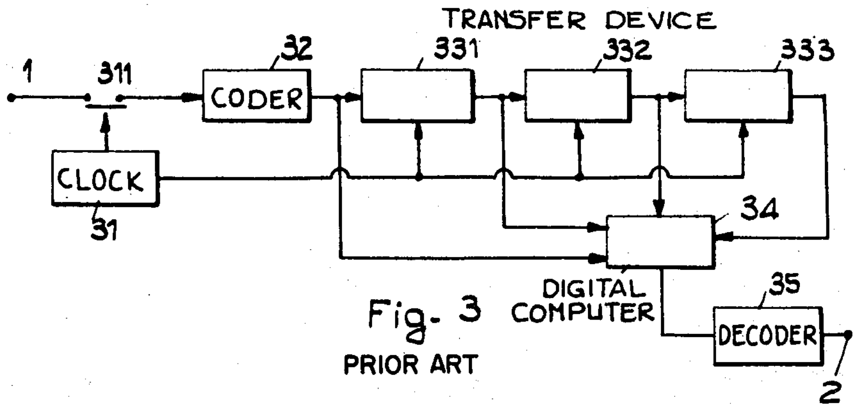
Fig. 3 PRIOR ART
FIG. 3 is a diagram of a comb filter of known construction with digital transfer.

FIG. 3 is an example of a known comb filter, of the transfer type, with digital weighting and summation.

In this drawing, the reference numerals 1 and 2 indicate, as above, the input terminal to which the signal to be filtered is applied and the output terminal which delivers the filtered signal.

The input signal is put into digital form in the coder 32. To this end, it is sampled by means of signals supplied by a clock 31 to an interruptor 311, placed in series between the terminal 1 and the coder. The signals coded in the coder 32 undergo successive transfers with a period $\tau$ in the digital transfer arrangements 331 to 333, for example a shift register, the transfers being synchronized by the signals from the clock 31, applied to the control inputs of the devices 331 to 333. In the same way, as the inputs and outputs of the delay lines of the system of FIG. 1 were connected to a weighting and summation circuit, the inputs and outputs of the transfer circuits are connected to an arithmetic calculator 34. A decoder 35, connected to the output of the latter supplies the filtered signal at 2. A modification of this system (not shown) comprises decoders placed, respectively, at the output of the coder and at the outputs of the transfer circuits, and the weighted sum is obtained as in the system of FIG. 1.

Thus, either the decoding, effected on the weighted sum, yields an acceptable accuracy, but the time needed for calculating this weighted sum is prohibitive, or the decoding is effected before the weighting, and the obtained precision is insufficient.

FIG. 4 shows the basic diagram of a filtering system according to the invention. This system comprises an input 1 and an output 2, a digital coder 32, for example, a binary coder, and sampling devices 31 and 311. There are in this example five transfer devices, for example, ferrite memories the transfer period being $\tau$. However, the calculator 34 of FIG. 3, which supplied the final weighted sum, that is, the final filtered signal (which had only to be decoded), is here replaced by a calculator 44. The latter makes only an intermediate weighted sum with weighting coefficients corresponding to a mere shifting of the radix, i.e., in the case of the binary code, to binary fractions (or to limited sums of such fractions), as shown, by way of example, in FIG. *5a* for the case of five transfer devices, where the numerical values indicating the weighting coefficients and the terminals from the left to the right correspond to the inputs of the calculator in the same order. The intermediate filtered signal, obtained at the output of the calculator 44 would have, if it were decoded, the shape indicated by the solid line curve in FIG. *5b*, where the frequency of the filtered signal is plotted as abscissae and the relative amplitude as ordinate, taking 1 as the amplitude of the central part with the frequency $\frac{1}{2}\tau$.

According to the invention, the signal filtered in this manner is applied to the input of a second transfer circuit comprising, for example, five transfer devices 431, 432, 433, 434, 435, also synchronized by the clock 31; the outputs of these devices as well as the input of the first one are connected to the inputs of decoders 450 to 455, whose outputs are connected to an analogue weighting and summing device of conventional type 46, at the output 2 of which the filtered signal appears. An example of the weighting coefficients used for this second filtering is shown in FIG. *5c* with the same notations as in FIG. *5a*, the terminals from the right to the left corresponding respectively and in the same direction to the inputs of the device 46. The resulting curve of the filter is shown in dotted line in FIG. *5b*.

It may be seen that the second filtering has made the curve both steeper near the second zero, and flatter in the useful zone.

FIG. 6 shows a pulse radar system comprising a filtering arrangement according to the invention.

The transmission circuits E, the duplexer D, the antenna An, and the HF part of the receiver R are entirely conventional.

The conventional synchronizing system S comprises, as known, a first output S1 controlling the transmission and at least one second output S2 for synchronizing the receiver.

According to the nature of the duplexer, the switching of the same is either automatic, or also controlled from the synchronizing device S.

According to the inventoin, the bipolar video delivered at the output 361 of the conventional HF part of the receiver R is treated by a filtering circuit of the type described with reference to FIG. 4. Since it is here necessary to treat not a single echo, but a certain number of echoes, say, *n* echoes, corresponding to as many distance channels, a transfer system is used comprising a memory 63 with *p* shelves, where *p* is equal to the number of transfers to be effected, in this case five, and *kn* bins per shelf, associated with a transfer register 63 where *k* is the number of samples by echo, say 2 for example, with *p* bins, the addressing being affected in a known manner by means of signals supplied at the output 613 of a clock 61, synchronized by the output signals S2 of the general synchronizing device S. The terminal 361 of the receiver HF is therefore connected to the digital coder 32 through the switch 311, which is controlled by the output signals delivered at the output 612 of the clock 61.

The drawing shows diagrammatically the memory as a rectangle with five lines or rows, each with *kn* bins, the position of an information in one of the bins being determined by the address signals.

The signals inscribed in the memory are re-inscribed at 631 at intervals $\tau$. A digital calculator 64, connected at 631 makes the first weighted sum. This sum is treated in a similar manner by the transfer system 73–731, corresponding to the system 63–631, the output of the latter being decoded in the device 65. The number of shelves, $p'$ of the memory 73 may be equal or not to that, $p$, of memory 63, $p'$ depending only on the accuracy desired.

The outputs of the decoder 65 are connected to an analogue calculator 66. The output of this calculator feeds a full wave rectifier 67 which supplies the useful signal, i.e., a signal free of the echoes of fixed targets or of targets whose speeds are lower than a given value. This signal can be used in various known ways; for example, as shown here, it may be applied to the signal input of a cathodic indicator which is synchronized by the output S2.

The application of the filter, which has been described with reference to FIG. 4, is obviously not limited to the radar system. More particularly, it will be noted that the basic diagram of the actual filtering circuit (elements 63, 631, 64, 73, 731, 65, 66, 67), shown in FIG. 6 for use in a radar system with *n* channels, may be used for filtering *n* variable continuous signals, provided that these signals have a common fluctuation "frequency," as shown in FIG. 7. In this case, these signals ($n=3$ in FIG. 7, where the amplitudes of the signals are shown, respectively, at *a*, *b*, *c*, as a function of the time) are sampled cyclically by *n* switches, having one terminal connected to the coder 32. These switches are controlled by signals from a clock 861 which also supplies the address signals of the memories 63 and 73.

Naturally, the invention is not limited to the embodiment hereinbefore described and shown only by way of example. The essential feature is the combination in succession of a weighted digital sum with weighting coefficients which correspond to a simple shifting of the decimal point or more generally of the radix, of the digital code selected, and of a weighted analogue sum of the signals supplied by the digital treatment.

What is claimed is:

1. A method for filtering signals with a periodical fluctuation, said method comprising the following steps: receiving said signals; sampling said signals with a predetermined period to obtain periodically repeated samples; digitally coding said samples according to a given code; storing *n* successive samples where *n* is an integer greater than one; affecting with respective weighting coefficients said stored signals, said weighting coefficients corresponding to displacements of the radix of said code, to obtain weighted signals; forming a weighted sum of said signals; storing *m* successive weighted sums, where *m* is an integer greater than one; decoding said *m* weighted sums to obtain decoder signals; affecting said signals with predetermined weighting coefficients to obtain weighted signals; and making a weighted sum thereof.

2. A method according to claim 1, wherein said code is binary.

3. A pulse radar system comprising transmitting means, receiving means supplying detected coherent pulses, and means for synchronizing said transmitting and receiving means, wherein the improvement comprises a system for eliminating echo pulses originating from stationary targets, said system comprising: first means, synchronized by said radar synchronizing means, for sampling and digitally coding said detected coherent pulses, said means having a first output; first storing means for storing *p* successive coherent pulses, as coded, originating from the same target, said storing means comprising *p* shelves of *kn* bins each, *n* being the number of simultaneous targets and *k* the number of samples by target, and a signal input coupled to said first output, an addressing input coupled to said synchronizing means and $n$ parallel outputs respectively coupled to said $n$ shelves; first shifting means for shifting said information stored in said memory from one shelf to the next one at each radar cycle, and for supplying simultaneously the $n$ successively stored values corresponding to the same target; computing means for weighting said simultaneously supplied $n$ values through respective shift of the radices, and summing said values as weighted to form a weighted sum; second storing means and shifting means identical with said first storing and shifting means, said weighted sum being applied to said second storing means; digital-to-analogue converting means for decoding the $m$ successively stored values stored in said second storing means corresponding to the same target, and analogue computing means for forming a weighted sum of said last mentioned $m$ successively stored values as decoded.

References Cited

UNITED STATES PATENTS 3,314,015 4/1967 Simone ---------- 328—151 X

RODNEY D. BENNETT, *Primary Examiner.*

C. L. WHITHAM, *Assistant Examiner.*